United States Patent Office 3,049,757
Patented Aug. 21, 1962

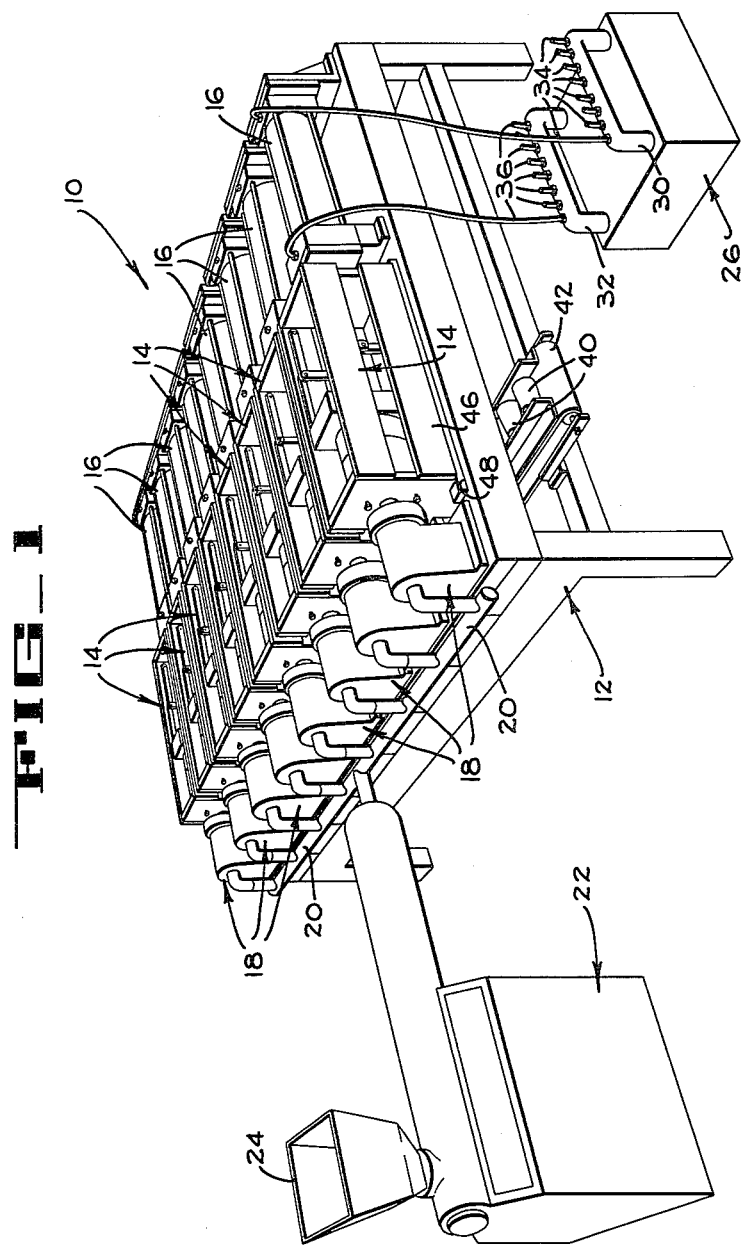

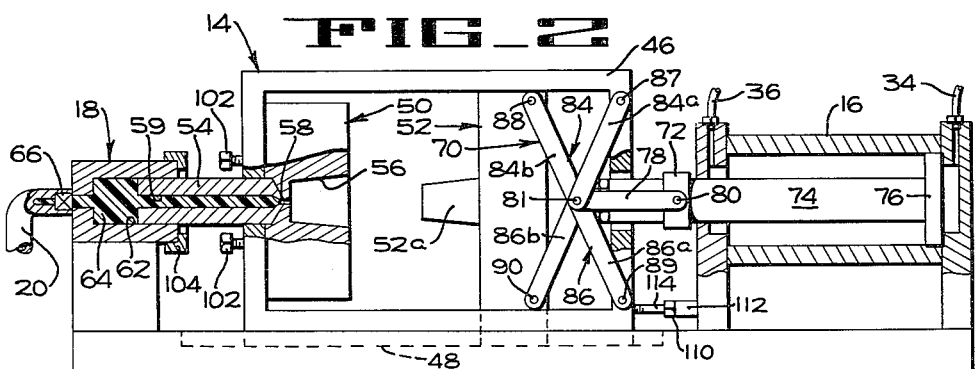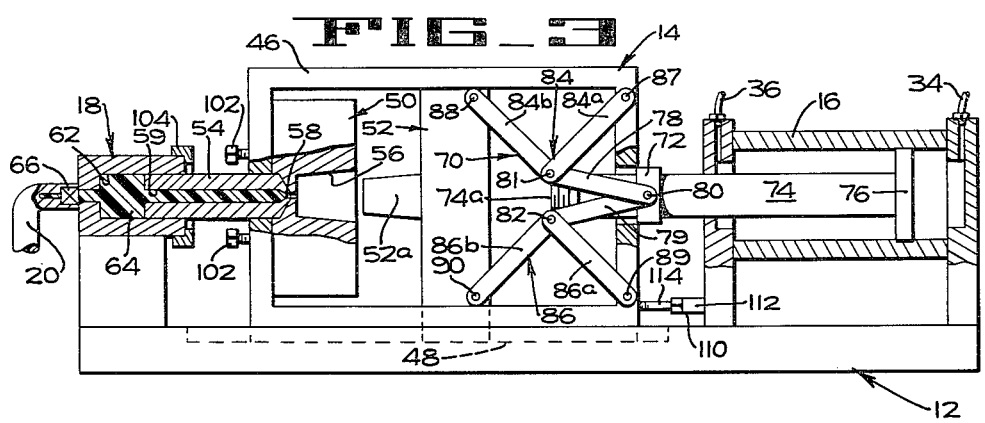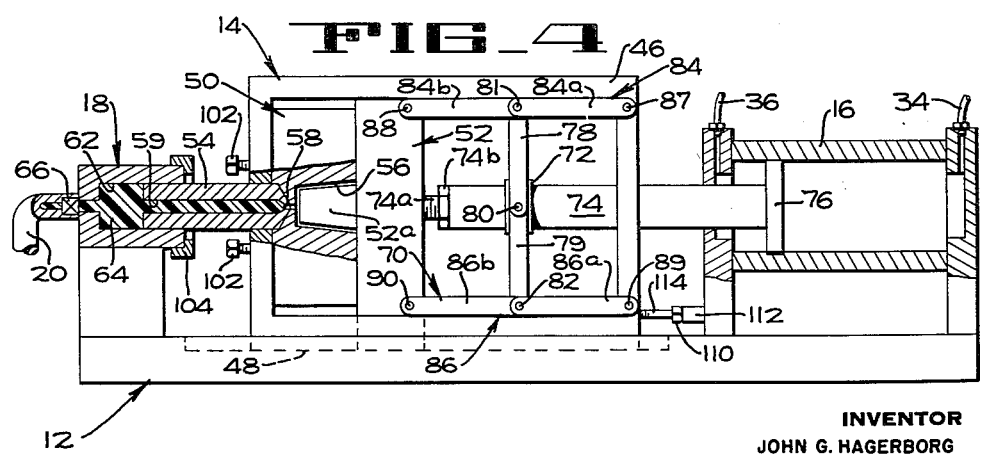

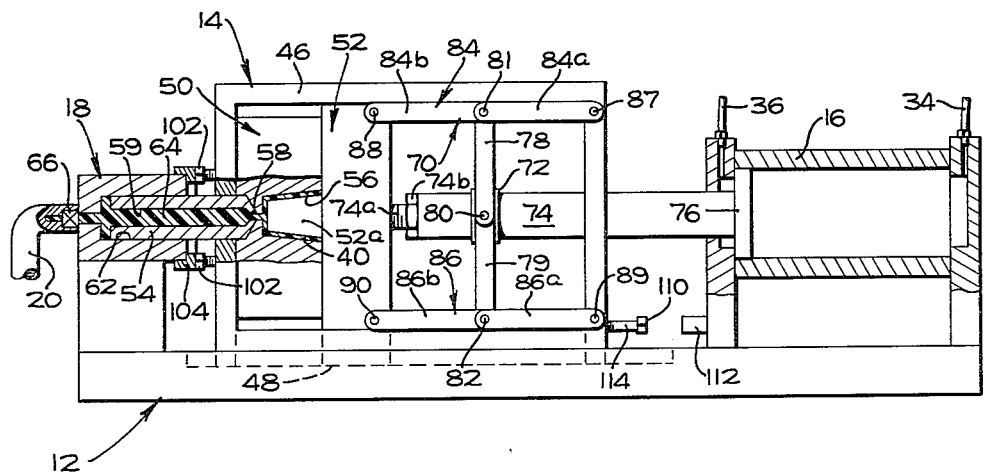
FIG_5
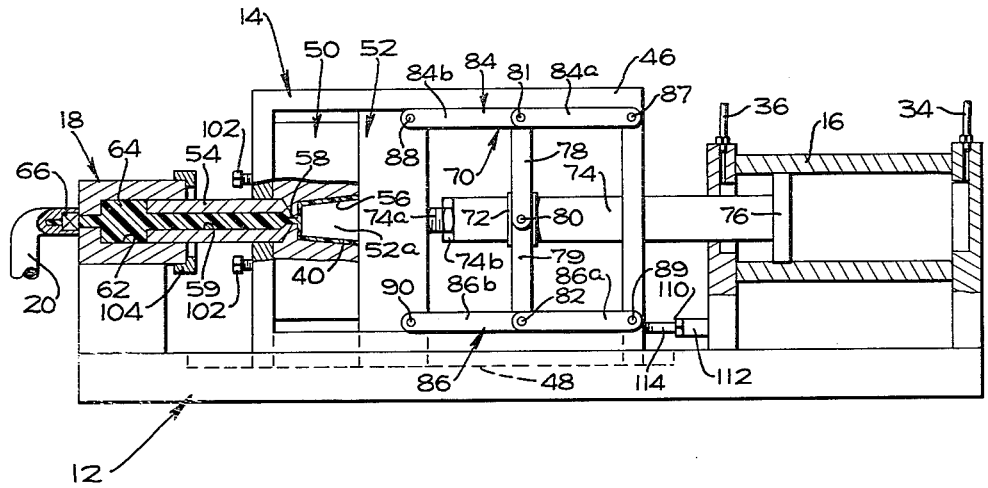
FIG_6
INVENTOR
JOHN G. HAGERBORG
BY Hans G. Hoffmeister
ATTORNEY

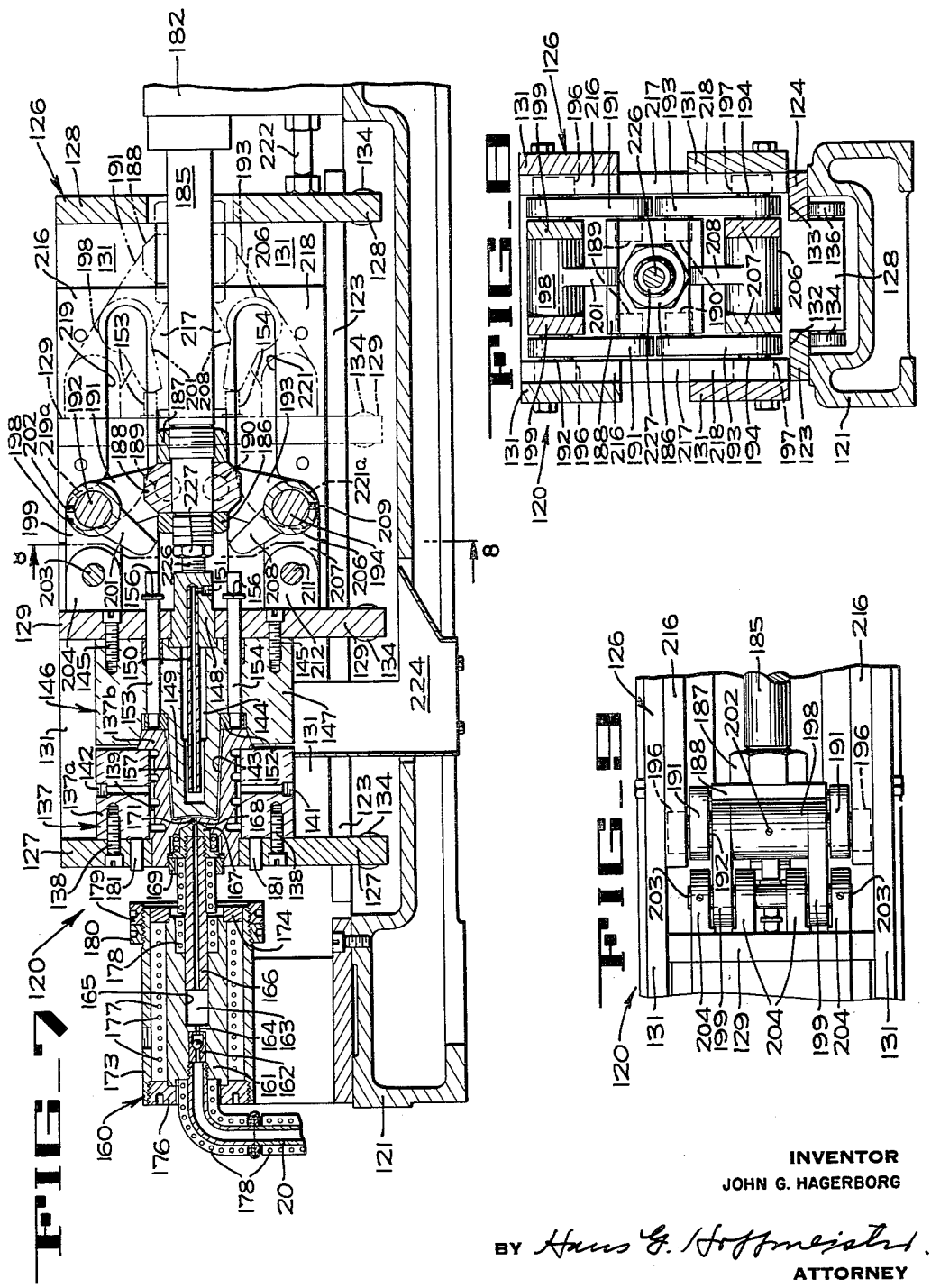

3,049,757
INJECTION MOLDING MACHINE
John G. Hagerborg, Los Gatos, Calif., assignor to FMC Corporation, a corporation of Delaware
Filed May 3, 1960, Ser. No. 26,599
7 Claims. (Cl. 18—30)

This invention relates to molding apparatus and more particularly pertains to injection molding machines for manufacturing articles from plastic or flowable material.

An object of the invention is to provide an improved injection molding machine.

Another object of the invention is to provide an improved mechanism for locking together the separable sections of a mold.

Another object of the invention is to provide an injection molding machine having a single hydraulic cylinder operating to both clamp the mold sections together and pressurize the material that is injected into the mold cavity.

Another object of the invention is to provide a molding machine operable at a production rate which is substantially higher than that achieved by machines presently in use.

Another object of the invention is to provide a molding machine having improved means for automatically measuring the volume of the material to be molded.

Another object is to provide an improved means of ejecting a molded article from a mold.

These and other objects and advantages of the invention will be apparent from the following description, taken in conjunction with the accompanying drawing, in which:

FIG. 1 is a perspective of several molding units and pressurizing and control equipment which comprise the injection molding machine of the invention.

FIGS. 2, 3, 4, 5 and 6 are diagrammatic side elevations of one molding unit of the molding machine of FIG. 1 which illustrate consecutive operations in an injection molding cycle.

FIG. 7 is an enlarged central vertical section of a second embodiment of a molding unit for use with the molding machine of FIG. 1.

FIG. 8 is a vertical section taken along line 8—8 of FIG. 7.

FIG. 9 is a top plan of a portion of the molding unit of FIG. 7.

The automatic injecting machine of the invention is indicated at 10 (FIG. 1) and comprises a table-like framework 12, a plurality of plastic injection molding units 14 mounted on the framework, an individual hydraulic cylinder 16 for each of the molding units 14, and a plastic measuring device, or material transfer cylinder 18 for each molding unit 14. The plastic measuring devices 18 are all connected to a manifold 20 which is in turn connected to a plastic pressurizing unit 22. The plastic pressurizing unit 22 includes a receiving hopper 24 and a plastic heater, not shown, and contains suitable means for pressurizing a plastic to a high hydrostatic pressure. For example, 500 p.s.i. has been found to be an efficient working pressure. Pressurized plastic is forced through the manifold 20 into all of the measuring devices 18 and from each measuring device 18 into the respective molding unit 14.

The production rate and the sequencing of a molding cycle are controlled by an automatically sequencing hydraulic mechanism 26 (FIG. 1). The hydraulic mechanism includes two chambers, not shown, containing a high and a low pressure hydraulic fluid, respectively. A high pressure manifold 30 is connected to one chamber and a low pressure manifold 32 is connected to the other chamber, and two fluid lines 34 and 36 connect opposite ends of each of the hydraulic cylinders 16 (FIG. 1) to the manifolds 30 and 32, respectively, of the automatic sequencing hydraulic mechanism 26. The hydraulic mechanism 26 is controlled by automatic sequencing mechanism (not shown) to supply hydraulic fluid at suitable pressure to each of the two manifolds 30 and 32 alternately and to relieve the pressure in the other which then serves as an exhaust manifold. Thus, the hydraulic mechanism 26 operates all of the injection molding units 14 causing each unit to produce, at a high production rate, molded plastic articles 40 (FIG. 1). The molded articles which in the illustrated mechanism are plastic cups, are removed on a suitably driven conveyor 42 mounted on the framework 12.

One injection molding unit 14 (FIGS. 2-6) which is a typical example of them all, comprises an open rectangular frame 46 which is mounted for horizontal movement in suitable ways 48 (FIGS. 1 and 2) which are formed in the surface of the framework 12. The ways 48 permit the frame 46 to be shifted longitudinally a short distance. The mold for the plastic articles to be molded comprises a female mold section 50 and a male mold section 52. The female section 50 is rigidly attached to the movable frame 46 (FIG. 2) in any suitable manner as by capscrews. The male section 52 is mounted for longitudinal movement within the frame 46 in the ways 48.

A cylindrical plunger 54 connects the plastic measuring device 18 with a mold cavity 56 in the female section 50 of the mold. The plunger 54 extends through the frame 46 and is screwed or otherwise fastened to the female mold section. The plunger 54 has a small orifice 58 in the end thereof which is connected to the female mold section, and the orifice 58 communicates with a central bore 59 in the plunger. The plunger is received for longitudinal movement in a cylindrical measuring chamber 62 in the plastic measuring device 18. Pressurized plastic 64 is conducted from the manifold 20 into the measuring chamber 62 through a check valve 66 which permits the plastic to flow from the manifold into the measuring chamber 62 and prevents flow of plastic in the opposite direction, i.e. from the measuring chamber 62 back into the manifold 20. The flow properties of the plastic 64 are such that no plastic flows through the bore 59 and out the small orifice 58 at the manifold pressure of 500 p.s.i. However, the plastic flows quite readily at the much higher pressure of injection.

An injection molding cycle consists of tightly clamping and locking the mold sections 50 and 52 together, followed by injecting the plastic into the mold cavity 56 at a high pressure, and then followed by mold separation. The clamping of the mold sections 50 and 52 of the present invention is accomplished by a toggle mechanism 70 (FIGS. 2-6). The toggle mechanism moves the male mold section 52 relative to the frame 46 and is operated by the hydraulic cylinder 16 through a yoke 72 fastened to the rod 74 of the piston 76 of the hydraulic cylinder 16.

The toggle mechanism is connected to the yoke 72 of the piston rod and comprises, on each side of the rod 74, a pair of short links 78 and 79 (FIGS. 3-6), both pivoted to the yoke on a pin 80. The short links 78 and 79 are connected by pivot pins 81 and 82 to toggles 84 and 86, respectively. The toggle 84 comprises links 84a and 84b. Link 84a is pivotally connected to the frame 46 by means of a pivot pin 87, and link 84b is pivoted to the male section of the mold by a pivot pin 88. Toggle 86 comprises links 86a and 86b, link 86a being pivotally connected to the frame 46 by a pivot pin 89 and link 86b being pivotally connected to the male mold section by a pivot pin 90. The piston rod 74 of the hydraulic piston 16 serves to extend the toggles 84 and 86 as the piston 76 moves from its right hand position (shown in FIG. 2), through an intermediate position (FIG. 3), to the position of FIG. 4. In the position of FIG. 4, an adjustment screw 74a, which is screwed into a tapped opening in the free end of the piston rod 74 and locked in place by a locknut 74b, abuts the rear face of the male mold section. At this time the four toggles (only toggles 84 and 86 being illustrated) have moved to approximately a straight line condition where they brace against the frame 46 and press the male mold section 52 tightly against the female mold section 50. The four toggles thus lock the mold sections firmly together and the mold sections are therefore prepared to receive an injection of plastic.

It will be seen in FIG. 4 that the frame 46, containing the locked mold sections, is movable leftward along the ways 48 in the framework 12. The frame 46 moves due to the action of high pressure hydraulic fluid acting on the piston 76 of the hydraulic cylinder 16. The high pressure hydraulic fluid moves the piston leftward from its position in FIG. 4 to its position in FIG. 5. Thus, the piston not only actuates the toggles to close the mold as above described, but it also moves the frame 46 of the molding unit leftward on the ways 48 to the extent permitted by a pair of adjustable stop screws 102 screwed into the frame 46 in position to abut a stop ring 104 fastened to the plastic measuring device 18. The volume of plastic injected can be precisely controlled by adjusting the screws 102. The plunger 54 moving with frame 46, moves leftward into the plastic measuring chamber 62 and thus forces plastic in the chamber 62 out the orifice 58 at a high pressure and injects it into the mold cavity 56. During the injection operation, the check valve 66 prevents flow of plastic from chamber 62 into the manifold 20.

After the passage of a short period of time, such as for example, three seconds, the plastic in the cavity 56 (FIG. 5) will have solidified sufficiently to permit the mold unit 14 to be opened. Prior to separating the female and male sections 50 and 52 of the mold, the frame 46 is returned from its position shown in FIG. 5 to its position shown in FIG. 6. During this return movement along the ways 48, the plunger 54 moves out of the measuring chamber 62. This movement of the plunger 54 immediately drops the pressure in the chamber 62 and permits the check valve 66 to open, admitting plastic at 500 p.s.i. into the measuring chamber 62 from the manifold 20, thus filling the chamber in preparation for the next cycle.

To open the mold and unlock the toggle, the piston 76 of the hydraulic cylinder 16 is moved from its position shown in FIG. 5 through its position shown in FIG. 6 to its position shown in FIG. 2. During the initial part of the movement of piston 76 from the position of FIG. 5, the mold sections 50 and 52 remain together due to the fact that considerable force is required to separate the sections from the molded article. Thus, the toggles are prevented from unlocking until the frame contacts a stop plate 112 of a stop mechanism 110 which will be explained presently.

If desired, the hydraulic fluid employed to retract the piston 76 may be at a lower pressure than that used to effect the working stroke of the piston.

It will be apparent that the distance which the plunger 54 is withdrawn from the chamber 62 controls the volume of plastic admitted thereinto during the return movement of the frame 46. The volume of the plastic to be injected therefore can be controlled by adjusting the distance which the frame 46 travels during its return movement. This distance is determined by the frame stop mechanism 110 (FIG. 6). The stop mechanism 110 comprises the stop plate 112 connected to the framework 12 of the machine, and one or more adjustable stop screws 114 (FIG. 5), screwed into the frame 46. The abutment of the heads of the screws 114 with the stop plate 112 limits the return travel of the frame 46.

The operation of the molding unit 14 is such that a precisely measured quantity of plastic is drawn into and fed out of the chamber 62 as a result of movement of the frame 46, and not, as in prior art units, as a result of the operation of a special injection cylinder or a weighting device.

The properties of the plastics used in the machine 10 are such that they tend to shrink as they cool; therefore, a molded article 40 tends to adhere to the projection 52a (FIG. 2) of the male mold section and this causes it to be withdrawn from the mold cavity 56 when the mold sections are separated. Suitable ejecting mechanism, one form of which will be described hereinafter, operates at this point in the cycle and removes the molded article 40 from the projection 52a. When removed, the articles drop directly onto the conveyor 42 (FIG. 1).

The embodiment of the molding unit 120 illustrated in FIGS. 7–9 comprises a base 121, which is secured to a table or base (not shown) that is similar to the table 12 of the injection molding machine 10, in any suitable manner such as by bolting. Two longitudinally extending tracks 123 and 124 (FIG. 8) in the form of bars which are bolted to the base 121 are adapted to slidably receive a box frame 126 for longitudinal movement. The box frame 126 includes transverse end walls 127 and 128 (FIG. 7) which are rigidly connected together by four longitudinally extending bars 131. An intermediate transverse wall 129, which is substantially the same in size and shape as the walls 127 and 128, is guided by the bars 131 for longitudinal movement within the box frame 126. The lower portion of each transverse wall is reduced in width to provide downwardly facing shoulders 132 and 133 (FIG. 8) which slidably support the box frame 126 on the tracks 123 and 124, respectively. Rollers 134 and 136 journalled on the lower portion of each transverse wall at each side thereof engage the lower surface of the tracks 123 and 124 and prevent the box frame 126 from moving upwardly away from the base during operation.

A female mold section 137 (FIG. 7) is connected to the transverse wall 127 by cap screws 138 and includes an outer ring-like piece 137a and an inner piece 137b, said pieces having a coolant chamber 139 formed therebetween. Opposed ports 141 and 142 extend through the outer piece 137a and communicate with the coolant chamber 139 to provide inlet and outlet passages, respectively, for a coolant, such as water that is circulated through the chamber 139 from any suitable source of supply (not shown). The pieces 137a and 137b are connected together in fluid tight relation as by welding. A recess 143 is provided in the inner piece 137b of the female mold section to receive the die portion of a male mold section 146 and to cooperate therewith to define a mold cavity as will be explained hereinafter.

The male mold section 146 is connected to the intermediate wall 129 by capscrews 145. The male mold section 146 includes a body portion 147 and a plug-like member 148 which is disposed in an opening in the wall 129. The members 147 and 148 are welded together and a cooling chamber 144 is formed by the member 148 and a cavity in a male die portion 149 formed on the body portion 147. A tube 150 projects into chamber 144 from the plug-like member 148 to a point near the forward end of the chamber. An inlet port 151 extends through the member 148 and communicates with the bore of the tube 150 to direct coolant from any suitable source through the tube 150, into chamber 144 and out a discharge port (not shown) in the body portion 147. An article ejector ring 152, fitted around the male die portion 149 is secured to push rods 153 and 154 which extend through and are slidably received in aligned openings in the intermediate wall 129 and in the die body 147. A collar 156 on each pusher rod limits the movement of the rod relative to the mold section 146.

When the female mold section 137 and male mold section 146 are locked together in the full line position of FIG. 7, the die portion 149 is disposed in the mold cavity 143 and the article discharge ring 152 is held in firm engagement with the rear end of the inner piece 137b of the female mold section 137. Thus, a mold cavity 157, which is defined by the adjacent surfaces of the recess 143, the mold die 149, and the discharge ring 152 determines the size and shape of the article to be molded.

The plastic to be injected into the space 157 flows from the manifold 20 of the injection molding machine 10 (FIG. 1) into a plastic measuring device 160 which is bolted to the base 121 forwardly of the box frame 126. The measuring device 160 (FIG. 7) comprises a cylindrical core 161 which is connected to the manifold 20 and is bored to receive a check valve 162, and to provide a flow passage 164 between the check valve 162 and a cylindrical measuring chamber 163 provided by one end of a central opening 165 of the core. The check valve 162 permits the flow of plastic from the manifold 20 into the measuring chamber 163 but prevents a flow in the opposite direction. A tubular piston 166 is slidably received in the central opening 165 of the core and has a flanged cap 167 screwed on one end thereof. The cap 167 has an orifice 168 therein which is of a size adapted to prevent free flow of plastic therethrough when subjected to a pressure equal to the pressure in the manifold 20. The flanged cap 167 is received in a recess in the inner piece 137b of the female mold section 137 and is locked in place by a threaded sleeve 169 screwed into a tapped end portion of the recess. An opening 171 provides a flow passage between the orifice 168 and the mold cavity 143.

A cylindrical housing 173 of the plastic measuring device 160 is provided with a ring 174 welded inside one end thereof and has an annular end cap 176 screwed in its other end. The ring 174 and end cap 176 cooperate to lock the core 161 concentrically within the cylindrical housing 173 and in spaced relation with the inner walls thereof. A heating element 177 of any suitable type is positioned between the inner wall of the housing 173 and the core 161, and is connected to any suitable heat source such as to a steam boiler. Other heating elements 178 are disposed around the tubular piston 166 and around the manifold 20 and cooperate with the element 177 to heat the plastic and maintain it in a liquid state.

In order to limit the forward movement of the box frame 126 toward the housing 173, a pair of stop nuts 179 and 180 are screwed on the rear end of the housing 173 and the nut 179 is disposed in position to engage pins 181 projecting from the forward end of the wall 127. The box frame 126 is moved by means, soon to be described, until the pins 181 contact the stop nut 179. By adjusting the nut 179 longitudinally of the cylindrical housing 173, the depth to which the tubular piston 166 enters the measuring chamber 163 may be varied, thereby varying the amount of plastic entering the space 157 in which the article is formed.

In order to move the box frame 126 relative to the plastic measuring device 160, and to move the intermediate wall 129 and the attached die 146 relative to the box frame 126, a hydraulic cylinder 182 (FIG. 7), that is similar to cylinder 16 of the injection molding machine 10, is secured to the base 121 at one end of the molding unit 120. The cylinder is provided with a piston rod 185 which is threaded adjacent its forward end to receive nuts 186 and 187. An apertured pusher block 188, which is locked on the piston rod 185 by the nuts 186 and 187, carries a pair of upper pivot pins 189 (FIG. 8) and a pair of lower pivot pins 190 projecting laterally outward from the sides thereof. A pair of upper links 191 (FIGS. 7, 8, and 9) are pivotally supported at their lower ends on the upper pins 189 and pivotally support a shaft 192 therebetween at their upper ends. Similarly, a pair of lower links 193 are pivotally supported at their upper ends by the lower pins 190 and pivotally support a shaft 194 therebetween at their lower ends. Rollers 196 (FIG. 8) are journalled on the ends of the shaft 192 and similar rollers 197 are journalled on the ends of the shaft 194.

An upper yoke 198 (FIGS. 7, 8 and 9), having parallel spaced arms 199 and a downwardly projecting tongue 201 integral therewith, is locked to the upper shaft 192 by a set screw 202. The arms 199 are pivotally connected to the intermediate wall 129 by a pin 203 which projects through holes in the arms 199 and holes in four apertured ears 204 (FIG. 9) welded to the intermediate wall 129. A lower yoke 206 is identical to the upper yoke 198 and includes spaced arms 207 and a tongue 208 integral therewith. The yoke 206 is locked on the lower shaft 194 by a set screw 209. The arms 207 are pivotally connected to the intermediate wall 129 by a pin 211 which projects through holes in the arms 207 and holes in apertured ears 212 which are welded to the intermediate wall 129.

For controlling the movement of the yokes 198 and 206, upper cam plates 216 are bolted to the adjacent longitudinally extending bars 131 (FIG. 8) of the frame 126, and lower cam plates 218 are bolted to the adjacent lower bars 131. The upper and lower cam plates on one side of the box frame 126 are preferably made of one piece, said plates being interconnected by a web 217 integral therewith. The upper cam plates 216 have elongated generally horizontal cam slots 219 (FIG. 7) with upwardly extending locking portions 219a formed therein. The upper rollers 196 ride in the slots 219 of their associated upper cam plates and, as shown in full lines in FIG. 7, are arranged to move up into the upwardly extending portions 219a of the slots 219. Likewise, the lower cam plates 218 are provided with elongated generally horizontal cam slots 221 having downwardly extending locking portions 221a within which the lower rollers 197 ride upon actuation of the piston rod 185.

The rearward movement of the box frame 126 away from the measuring device 160 is limited by an adjustable abutment bolt 222 (FIG. 7) which is screwed into the front wall of the hydraulic cylinder 182 and abuts the transverse wall 128 of the box frame 126. A chute 224 is bolted to the base 121 of the molding unit 120 and serves to guide the finished articles onto the conveyor 42 (FIG. 1) when the article is discharged from the molding unit.

As shown in FIG. 7 means for adjusting the length of the piston rod 185 is provided and includes a set screw 226 screwed into the end of the piston rod 185 and locked in adjusted position by a nut 227. The screw 226 is adjusted to engage the plug-like member 148 of the male mold section 146 when the female mold section 137 and the male mold section are locked together as shown in full lines in FIG. 7.

The operation of the modified molding unit 120 is substantially the same as that of the molding unit 14 (FIG. 1), and therefore, only the differences between the two units will be described in detail. With the box frame 126 in the rearmost position, as shown in FIG. 7, and when the piston rod 185 is moved to the rearmost position, the male mold section and female mold section are separated and the yokes 198 and 206 are in the phantom line position. Forward movement of the piston rod 185 first moves the intermediate wall 129 relative to the box frame 126, allowing the rollers 196 and 197 (FIG. 8) to enter the slot portions 219a and 221a (FIG. 7), respectivey, to lock the male mold section 146 and female mold section 137 together. Just as the mold sections close the screw 226 comes into abutting contact with the plug-like member 148 of the male mold section to positively move the box frame 126 and the locked mold section toward the plastic measuring device 160 until the pins 181 in the transverse wall 127 engage the stop nut 179. This movement causes the tubular piston 166 to enter the measuring chamber 163 to displace a measured portion of the plastic therein and force an equivalent amount of plastic into the article space 157. By varying the position of the nut 179 so that more plastic enters the space 157, the density of the plastic in the finished article will be higher.

After ample time is allowed for hardening of the plastic in the space 157, the rearward stroke of the piston rod 185 is begun. The box frame 126 is returned to the solid line position of FIG. 7, and the intermediate wall 129 is moved to the phantom line position, thereby fully opening the mold sections. During the rearward movement of the male mold section, the tongues 201 and 208 are pivoted back into contact with the article ejector rods 153 and 154 to move the rods forwardly relative to the male mold section, causing the molded article to be loosened from the male die portion 149. The freed article then falls through the chute 224 onto a suitable discharge conveyor therebelow.

From the foregoing description it is apparent that the improved injection molding machine of the present invention is arranged upon forward movement of a piston rod to first lock two mold sections together and thereafter cause movement of a predetermined amount of the plastic material from the measuring chamber 163 to the mold cavity 157. The density of the finished product may be easily varied by adjusting the stroke of the mold sections and tubular piston supported thereby, and the machine provides means for positively ejecting the finished article from the male mold die.

While two embodiments of the present invention have been shown and described, it will be understood that various changes and modifications may be made without departing from the spirit of the invention or the scope of the appended claims.

The present invention and the manner in which the same is to be used having thus been described, what is claimed as new and desired to protect by Letters Patent is:

1. An injection molding machine comprising a base, a material transfer cylinder rigidly secured to said base for receiving flowable material to be molded, a pair of mold sections mounted on said base for movement relative to each other and to said cylinder to define an article forming cavity therebetween, a tubular piston slidable in said cylinder and connected to one of said mold sections for movement therewith and having an opening providing a flow passage between said cylinder and said article forming cavity, and means connected to one mold section for first moving said one mold section relative to said other section into cavity forming position and subsequently moving both of said mold sections and said tubular piston as a unit relative to said cylinder to force said piston into said cylinder to reduce the volume thereof and transfer a measured volume of material from said cylinder into said article forming cavity, first and second stop members, means mounting said first stop member on said one mold section, and means mounting said second stop member on said cylinder in opposed relation to said first stop member for engagement by said first stop member during travel of said piston into said cylinder, one of said stop members being adjustable toward and away from the other stop member to adjust the extent of travel of said piston into said cylinder.

2. An injection molding machine comprising a table, a frame movably mounted on said table, a first mold section fixed to said frame and movable therewith, a second mold section slidably mounted in said frame for movement toward and away from said first mold section, a material transfer cylinder rigidly mounted on said table adjacent the movable frame, means connecting said cylinder to a source of flowable material under pressure, a tubular piston fixed to said first mold section and slidably received within said cylinder, a linkage connecting said second mold section and said movable frame, fluid motor means fixed to the table adjacent said movable frame, a rod connected to said fluid motor means and movable thereby toward and away from said mold sections, and means connecting said rod to said linkage to effect movement thereof for moving said second mold section into locking engagement with said first mold section upon movement of said rod toward said mold sections, said rod being adapted to abut said second mold section upon locking of said linkage means to effect movement of said mold sections and movable frame toward said material receiving cylinder to effect transfer of material therefrom into the mold cavity.

3. An injection molding machine comprising a table, a frame movably mounted on said table, a first mold section fixed to said frame and movable therewith, a second mold section slidably mounted in said frame for movement toward and away from said first mold section, a material transfer cylinder rigidly mounted on said table adjacent the movable frame, means connecting said cylinder to a source of flowable material under pressure, a tubular piston fixed to said first mold section and slidably received within said cylinder, a toggle means connecting said second mold section and said movable frame, fluid motor means fixed to the table adjacent said movable frame, a rod connected to said fluid motor means and movable thereby toward and away from said mold sections, means connecting said rod to said toggle means to effect movement thereof for moving said second mold section into locking engagement with said first mold section upon movement of said rod toward said mold sections, said rod being adapted to abut said second mold section upon locking of said toggle means to effect movement of said mold sections and movable frame toward said material receiving cylinder to effect transfer of a measured quantity of material therefrom into the mold cavity, and abutment means on said rod between said rod and said second mold, said abutment means being adjustable toward and away from said second mold section to vary the extent of movement of said toggle and thereby effect the pressure between said mold sections.

4. An injection molding machine comprising a table, a frame movably mounted on said table, a first mold section fixed to said frame and movable therewith, a second mold section slidably mounted in said frame for movement toward and away from said first mold section, a material transfer cylinder mounted on said table adjacent the movable frame, means connecting said cylinder to a source of flowable material, a tubular piston fixed to said first mold section and slidably received within said cylinder, a linkage means connecting said second mold section and said movable frame, said linkage means comprising a plate fixed to said frame, two cam slots formed in said plate, a shaft projecting through each cam slot, a link connecting each shaft with said second mold section, fluid motor means fixed to the table adjacent said movable frame, a rod connected to said fluid motor means and movable thereby toward and away from said mold sections, and means connecting said rod to said shafts to effect movement thereof relative to said slots for moving said second mold section into locking engagement with said first mold section upon movement of said rod toward said mold sections, said rod being adapted to abut said second mold section upon locking of said linkage means to effect movement of said mold sections and movable frame toward said material receiving cylinder to effect transfer of a measured quantity of material therefrom into the mold cavity.

5. In a molding machine, a base, a transfer cylinder rigidly mounted on said base, a source of moldable material under pressure, material conducting means interconnecting said source and said cylinder and including a valve permitting flow of material from said source to said cylinder and precluding flow from said cylinder to said source, a support mounted on said base for movement toward and away from said cylinder, a mold section rigidly connected to said support, said mold section providing a mold cavity, a material conducting plunger slidably fitted in said cylinder and rigidly connected to said mold section, said plunger having a material passageway establishing communication between said cavity and said cylinder, and abutment members on said support and said cylinder for contact with each other during movement of said support toward said cylinder, one of said members being adjustable toward and away from the other of said members to adjust the extent of movement of said plunger into said cylinder.

6. In a molding machine, a base, a material transfer cylinder rigidly mounted on said base, a fluid powered ram mounted on said base in spaced relation to said cylinder, a frame mounted on said base for movement between said cylinder and said ram, said frame having spaced, rigidly interconnected first and second end portions respectively adjacent to said cylinder and said ram, a first mold section secured to said first end portion of said frame, a material conducting plunger slidable in said cylinder and secured to said first mold section for conducting moldable material from said cylinder into said first mold section, a second mold section mounted in said frame for movement between a mold closed position relatively adjacent to said first mold section and a mold open position spaced farther from said first section than in said closed position, said ram including a reciprocable rod projecting through said second end portion of said frame for movement between a forward position engaging said second mold section and a retracted position spaced rearward from said second mold section, mold links pivoted to said second mold section on opposite sides of and outwardly from a plane passing through said ram, ram links pivoted to said rod closely adjacent to said plane, each mold link having a corresponding ram link, intermediate pivots pivotally interconnecting corresponding mold and ram links, and bearing means connected to said frame and individually and continuously engaging said intermediate pivots for constraining said intermediae pivots to move along arcuate paths between inner positions adjacent to said plane when said rod is in retracted position and outer positions spaced outward from their inner positions when said rod is in its forward position so that when said rod moves from retracted to forward position, said links move said second mold section to closed position and lock said mold sections together, and so that when said rod moves forwardly from said forward position, said plunger, frame, and mold sections are unitarily moved toward said cylinder.

7. The machine of claim 6 wherein said bearing means includes elongated slots having rear portions substantially parallel to said rod and forward portions extending from said rear portions arcuately outward from said rod, and wherein said intermediate pivots project into said slots.

References Cited in the file of this patent

UNITED STATES PATENTS

| Re. 19,000 | Scribner | Nov. 14, 1933 |
| 2,801,613 | Ratzer | Apr. 21, 1931 |
| 2,480,313 | Alden | Aug. 30, 1949 |
| 2,582,029 | Halward | Jan. 8, 1952 |
| 2,680,883 | Ashbavgh | June 15, 1954 |
| 2,804,649 | Hupfield | Sept. 3, 1957 |
| 2,828,509 | Smucker | Apr. 1, 1958 |
| 2,988,778 | Chase et al. | June 20, 1961 |

FOREIGN PATENTS

| 551,468 | Great Britain | Feb. 24, 1943 |
| 675,652 | Great Britain | July 16, 1952 |